(12) United States Patent
Lumpkin

(10) Patent No.: US 10,809,393 B2
(45) Date of Patent: Oct. 20, 2020

(54) MONOCRYSTAL-BASED MICROCHANNEL PLATE IMAGE INTENSIFIER

(71) Applicant: Fermi Research Alliance, LLC, Batavia, IL (US)

(72) Inventor: Alex H. Lumpkin, Naperville, IL (US)

(73) Assignee: FERMI RESEARCH ALLIANCE, LLC, Batavia, IL (US)

( * ) Notice: Subject to any disclaimer, the term of this patent is extended or adjusted under 35 U.S.C. 154(b) by 0 days.

(21) Appl. No.: 15/568,500

(22) PCT Filed: Apr. 21, 2016

(86) PCT No.: PCT/US2016/028564
§ 371 (c)(1),
(2) Date: Oct. 23, 2017

(87) PCT Pub. No.: WO2016/172291
PCT Pub. Date: Oct. 27, 2016

(65) Prior Publication Data
US 2018/0120452 A1 May 3, 2018

Related U.S. Application Data

(60) Provisional application No. 62/151,535, filed on Apr. 23, 2015.

(51) Int. Cl.
*G01T 1/20* (2006.01)
*G01T 1/164* (2006.01)
(Continued)

(52) U.S. Cl.
CPC .......... *G01T 1/2012* (2013.01); *G01T 1/1645* (2013.01); *G01T 1/202* (2013.01);
(Continued)

(58) Field of Classification Search
CPC ..... G01T 1/2012; G01T 1/1645; G01T 1/202; G02B 6/06; H01J 43/246
(Continued)

(56) References Cited

U.S. PATENT DOCUMENTS 3,102,955 A * 9/1963 Carlson ................ G01T 1/2002
250/368
3,304,244 A * 2/1967 Granitsas .............. H01J 29/892
205/118

(Continued)

OTHER PUBLICATIONS

Touš, "High-resolution application of YAG:Ce and LuAG:Ce imaging detectors with a CCD X-ray camera", Nucl. Instrum. Methods Phys. Res. A, 591(1), 264-267 (Year: 2008).*
(Continued)

*Primary Examiner* — Blake C Riddick
(74) *Attorney, Agent, or Firm* — Loza & Loza LLP; Kevin L. Soules

(57) ABSTRACT

A monocrystalline scintillator comprises a monocrystal and an optical plate wherein a first side of the monocrystal is adhered to the optical plate. The monocrystal comprises at least one of a rare earth garnet, a perovskite crystal, a rare-earth silicate, and a monocrystal oxysulphide. The scintillator assembly includes an adhesive adhering the optical plate to the first side of the monocrystal. The adhesive can comprise an ultra-high vacuum compatible adhesive. The adhesive is substantially transparent and has a refractive index matching the optical plate. The scintillator assembly can also include a reflective coating on the second side of the monocrystal. The monocrystalline scintillator assembly can be incorporated in a microchannel plate image intensifier tube to provide improved spatial resolution and temporal response.

18 Claims, 4 Drawing Sheets

(51) Int. Cl.
  *G01T 1/202* (2006.01)
  *H01J 43/24* (2006.01)
  *G02B 6/06* (2006.01)
  *G02B 6/08* (2006.01)
  *H01J 31/50* (2006.01)

(52) U.S. Cl.
  CPC ............ *G02B 6/06* (2013.01); *G02B 6/08* (2013.01); *H01J 43/246* (2013.01); *H01J 31/507* (2013.01)

(58) Field of Classification Search
  USPC .................. 250/370.11, 370.09, 370.08
  See application file for complete search history.

(56) References Cited

U.S. PATENT DOCUMENTS

| | | | | |
|---|---|---|---|---|
| 3,432,659 A * | 3/1969 | Elton | G01T 1/20 | 250/368 |
| 3,462,601 A * | 8/1969 | Sternglass | H01J 31/48 | 250/336.1 |
| 3,666,957 A * | 5/1972 | Wyess | H01J 43/246 | 250/214 VT |
| 4,145,609 A * | 3/1979 | Takami | G01T 1/1642 | 250/361 R |
| 4,227,082 A * | 10/1980 | Mayeux | G01T 1/16 | 250/336.1 |
| 4,323,925 A * | 4/1982 | Abell | G01J 1/04 | 348/340 |
| 4,365,155 A * | 12/1982 | Oi | C09K 11/68 | 250/370.11 |
| 4,489,251 A * | 12/1984 | Beauvais | H01J 31/501 | 313/105 CM |
| 4,603,250 A * | 7/1986 | Contini | G01S 7/4816 | 250/214 VT |
| 4,660,095 A | 4/1987 | Cannella et al. | | |
| 4,689,487 A * | 8/1987 | Nishiki | G01T 1/2018 | 250/361 R |
| 4,758,071 A * | 7/1988 | McLaughlin | G02B 3/0087 | 359/653 |
| 4,791,300 A * | 12/1988 | Yin | G01T 1/28 | 250/363.01 |
| 4,983,834 A * | 1/1991 | Lindmayer | C09K 11/7786 | 250/363.01 |
| 5,079,423 A * | 1/1992 | Hagiwara | G01T 1/2018 | 250/368 |
| 5,132,539 A * | 7/1992 | Kwasnick | G01T 1/2018 | 250/361 R |
| 5,159,455 A * | 10/1992 | Cox | H04N 5/2624 | 348/218.1 |
| 5,351,278 A * | 9/1994 | Koshishiba | G01N 23/046 | 378/22 |
| 5,369,267 A * | 11/1994 | Johnson | H01J 31/505 | 250/214 VT |
| 5,386,122 A * | 1/1995 | Yoshida | G01T 1/2018 | 250/368 |
| 5,442,181 A * | 8/1995 | Yamakawa | G01T 1/1642 | 250/368 |
| 5,550,378 A * | 8/1996 | Skillicorn | A61B 6/06 | 250/367 |
| 5,552,602 A * | 9/1996 | Kakibayashi | G01N 23/046 | 250/311 |
| 5,554,850 A * | 9/1996 | Hejazi | G01T 1/201 | 250/367 |
| 5,572,034 A * | 11/1996 | Karellas | G01T 1/2018 | 250/367 |
| 5,594,253 A * | 1/1997 | Bueno | G01T 1/201 | 250/367 |
| 5,635,720 A | 6/1997 | Mooney et al. | | |
| 5,636,299 A * | 6/1997 | Bueno | G01T 1/201 | 250/367 |
| 5,828,724 A * | 10/1998 | Kurtz | G01N 23/20041 | 378/70 |
| 5,864,146 A * | 1/1999 | Karellas | A61B 6/06 | 250/581 |
| 5,866,907 A * | 2/1999 | Drukier | G01N 33/60 | 250/328 |
| 5,872,364 A * | 2/1999 | Strommer | A61B 6/14 | 250/370.09 |
| 5,932,880 A * | 8/1999 | Koguchi | H01J 37/244 | 250/397 |
| 5,933,473 A * | 8/1999 | Kitaguchi | G01N 23/043 | 378/149 |
| 5,998,790 A * | 12/1999 | Downing | H01J 37/224 | 250/311 |
| 6,031,234 A * | 2/2000 | Albagli | G01T 1/2002 | 250/368 |
| 6,091,796 A * | 7/2000 | Trissel | G21K 7/00 | 250/361 R |
| 6,448,544 B1 * | 9/2002 | Stanton | G01T 1/2928 | 250/208.1 |
| 6,965,409 B1 * | 11/2005 | Hamamoto | G02B 6/08 | 348/340 |
| 7,863,572 B1 * | 1/2011 | Doty | G01T 1/2023 | 250/361 R |
| 2002/0021786 A1 * | 2/2002 | Hamamoto | H04N 5/2253 | 378/189 |
| 2002/0038851 A1 * | 4/2002 | Kajiwara | A61B 6/4216 | 250/368 |
| 2002/0070365 A1 * | 6/2002 | Karellas | A61B 6/06 | 250/581 |
| 2002/0131044 A1 * | 9/2002 | Kobayashi | G01J 3/02 | 356/419 |
| 2002/0190219 A1 | 12/2002 | Mooney | | |
| 2002/0197034 A1 * | 12/2002 | Thomas | G02B 6/06 | 385/115 |
| 2003/0042425 A1 * | 3/2003 | Tashiro | G01T 1/2928 | 250/370.11 |
| 2003/0164453 A1 * | 9/2003 | Nakata | C03B 37/028 | 250/370.09 |
| 2004/0251420 A1 * | 12/2004 | Sun | G01T 1/2018 | 250/370.09 |
| 2005/0057756 A1 * | 3/2005 | Fang-Yen | G01B 9/02072 | 356/497 |
| 2005/0087693 A1 * | 4/2005 | Sumiya | G01T 1/2018 | 250/367 |
| 2005/0104001 A1 | 5/2005 | Shah | | |
| 2006/0124854 A1 * | 6/2006 | Shah | G01T 1/1644 | 250/363.04 |
| 2006/0219963 A1 * | 10/2006 | Moody | A61B 6/145 | 250/580 |
| 2007/0252154 A1 * | 11/2007 | Uchiyama | B23K 26/0861 | 257/77 |
| 2008/0031418 A1 * | 2/2008 | Tseng | G01T 1/20 | 378/98.3 |
| 2008/0083877 A1 * | 4/2008 | Nomura | G01T 1/2018 | 250/370.11 |
| 2008/0309914 A1 * | 12/2008 | Cantin | G01S 17/10 | 356/4.01 |
| 2009/0101844 A1 * | 4/2009 | Ohbayashi | G01T 1/20 | 250/488.1 |
| 2009/0116720 A1 * | 5/2009 | Ritman | A61B 6/00 | 382/132 |
| 2009/0220201 A1 * | 9/2009 | Reichel | G02B 6/06 | 385/116 |
| 2010/0016717 A1 * | 1/2010 | Dogra | A61B 5/0059 | 600/437 |
| 2010/0032578 A1 * | 2/2010 | Levene | G01T 1/1644 | 250/370.11 |
| 2010/0034345 A1 * | 2/2010 | Heismann | G01T 1/20 | 378/19 |
| 2010/0200758 A1 * | 8/2010 | Fukuda | G01T 1/2018 | 250/362 |
| 2010/0230605 A1 * | 9/2010 | Partouche-Sebban | G01T 1/20 | 250/368 |
| 2010/0264322 A1 * | 10/2010 | Levene | G01T 1/2018 | 250/367 |
| 2011/0024634 A1 | 2/2011 | Shah et al. | | |
| 2011/0121187 A1 | 5/2011 | Frank | | |

(56) References Cited

U.S. PATENT DOCUMENTS

| | | | |
|---|---|---|---|
| 2011/0176657 A1* | 7/2011 | Okuda | C09K 11/778 378/21 |
| 2011/0255068 A1 | 10/2011 | Kools | |
| 2012/0091350 A1 | 4/2012 | Gagnon et al. | |
| 2012/0129346 A1* | 5/2012 | Ryuzaki | B24B 37/044 438/693 |
| 2012/0141771 A1* | 6/2012 | Pan | C04B 35/6261 428/312.8 |
| 2012/0228512 A1* | 9/2012 | van Arendonk | G01T 1/2018 250/368 |
| 2012/0286165 A1* | 11/2012 | Gautier | G01T 1/202 250/361 R |
| 2012/0312998 A1* | 12/2012 | Osawa | G21K 4/00 250/366 |
| 2013/0075617 A1* | 3/2013 | Simonetti | G21K 4/00 250/361 R |
| 2013/0082184 A1* | 4/2013 | Nakatsugawa | A61B 6/4208 250/366 |
| 2013/0126753 A1* | 5/2013 | Aylward | B32B 37/1284 250/458.1 |
| 2013/0306874 A1* | 11/2013 | Yoshikawa | C09K 11/7774 250/361 R |
| 2013/0313603 A1* | 11/2013 | Kundaliya | C30B 23/025 257/98 |
| 2013/0341516 A1* | 12/2013 | Ishida | G01T 1/2006 250/363.02 |
| 2014/0301528 A1* | 10/2014 | La Riviere | G01N 23/223 378/5 |
| 2015/0320376 A1* | 11/2015 | Oishi | A61B 6/4405 378/199 |
| 2015/0331117 A1* | 11/2015 | Ho | G01T 1/2004 250/367 |
| 2016/0038110 A1* | 2/2016 | Hayashi | A61B 6/462 378/119 |
| 2016/0079490 A1* | 3/2016 | De Boer | H01L 33/58 257/88 |
| 2016/0217879 A1* | 7/2016 | Oike | G01T 1/2018 |
| 2016/0252631 A1* | 9/2016 | Blahuta | C09K 11/7774 250/361 R |
| 2016/0259070 A1* | 9/2016 | Fukuda | G01T 3/06 |
| 2016/0282479 A1* | 9/2016 | Tanino | G01T 1/20 |
| 2016/0313452 A1* | 10/2016 | Hartmann | G01T 1/16 |
| 2017/0073578 A1* | 3/2017 | Takahashi | C04B 35/597 |
| 2017/0121601 A1* | 5/2017 | Lynn | C09K 11/7774 |
| 2017/0212251 A1* | 7/2017 | Hadjioannou | G01T 1/2985 |
| 2017/0227176 A1* | 8/2017 | Inoue | F21V 29/74 |
| 2017/0307767 A1* | 10/2017 | Zyazin | G01T 1/2002 |
| 2017/0322323 A1* | 11/2017 | Fischer | G01T 1/2006 |
| 2018/0286923 A1* | 10/2018 | Fischer | G21K 4/00 |

OTHER PUBLICATIONS

Touš, J. et al., "High Resolution Thin Scintillator Imaging Plates Used for X-Ray NDT Applications", 2nd Int. Symp. on NDT in Aerospace 2010—Poster 4 (Year: 2010).*

Touš, J. et al., "Single crystal scintillator plates used for light weight material X-ray radiography", J. Phys.: Conf. Ser. 425 192017, 1-4 (Year: 2013).*

Yanagida, T. et al., "Scintillation properties of composite ceramic YAG and its capability on pulse shape descrimination" J. Ceram. Soc. Jpn. 122(12), 1016-1019 (Year: 2014).*

Lumpkin, A.H. And Macrander, A.T., "First Indirect X-ray Imaging Tests with an 88-mm Diameter Single Crystal", arXiv: 1709.04865v1 (Year: 2017).*

Saint-Gobain, "Scintillation Materials and Assemblies", 2014, saint-gobain.com, retrieved from the Internet Archive Wayback Machine dated Oct. 14, 2014 (Year: 2014).*

Simura, R. et al., "The radial distribution of dopant (Cr, Nd, Yb, or Ce) in yttrium aluminum garnet (Y3Al5O12) single crystals grown by the micro-pulling-down method", Journal of Crystal Growth 311, 4763-4769 (Year: 2009).*

* cited by examiner

MONOCRYSTAL-BASED MICROCHANNEL PLATE IMAGE INTENSIFIER

CROSS REFERENCE TO RELATED APPLICATIONS

This application is the US national phase of International Application No. PCT/US2016/028564, filed on Apr. 21, 2016 under the PCT (Patent Cooperation Treaty), and claims priority to U.S. Provisional Patent Application Nos. 62/151,535, filed Apr. 23, 2015. The entire contents of these applications are incorporated herein by reference.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

Embodiments are generally related to the field of radiant energy and more specifically to an imaging system. Embodiments are also related to low light imaging systems, biomedical applications, and X-ray imaging. Embodiments further relate to monocrystalline scintillators. Embodiments additionally relate to monocrystal based microchannel plate image intensifiers.

BACKGROUND

Many image intensifiers use a microchannel plate which intensifies single particle detection by the multiplication of electrons via secondary emission. Prior art microchannel plates are made from a standard P43 polycrystalline phosphor layered onto an output window. The spatial resolution using this phosphor is only about 15 μm full width half max (FWHM), resulting in a visual acuity of approximately 20/36. Devices using such microchannel plates also have a 1.5 ms decay time, limiting the imaging speed and the ability to shutter out unwanted prompt bursts of light.

As such, there is a need in the art for improved multichannel plate image intensifiers that provide enhanced spatial resolution and imaging speed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved enhanced spatial resolution and imaging speed in imaging devices.

It is another aspect of the disclosed embodiments to provide for improved microchannel plate image intensifiers.

It is a further aspect of the disclosed embodiments to monocrystal scintillators.

It is an aspect of the disclosed embodiments to provide monocrystal based scintillators for use in microchannel plate image intensifiers and related applications.

The aforementioned aspects and other objectives and advantages can now be achieved as described herein. A monocrystalline scintillator assembly comprises a monocrystal and an optical plate wherein a first side of the monocrystal is adhered to the optical plate. The monocrystal comprises at least one of a rare earth garnet, a perovskite crystal, a rare-earth silicate, and a monocrystal oxysulphide. In an embodiment, the monocrystal includes a doped volume.

The monocrystalline scintillator comprises an adhesive adhering the optical plate to the first side of the monocrystal. The adhesive can comprise an ultra-high vacuum compatible adhesive. The adhesive is substantially transparent and has a refractive index matching the optical plate. In an embodiment, the optical plate is a fiber optic plate.

The monocrystalline scintillator further comprises a layer on a second side of the monocrystal. The layer on the second side of the monocrystal can comprise a reflective coating.

The optical plate can comprise an output window in a microchannel plate image intensifier tube. In another embodiment, the monocrystalline scintillator is located within one of an image intensified camera, a fast framing camera device, a streak tube device, an indirect x-ray imaging device, an indirect particle beam device, a direct photon image device, a night-vision device, and a surveillance device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
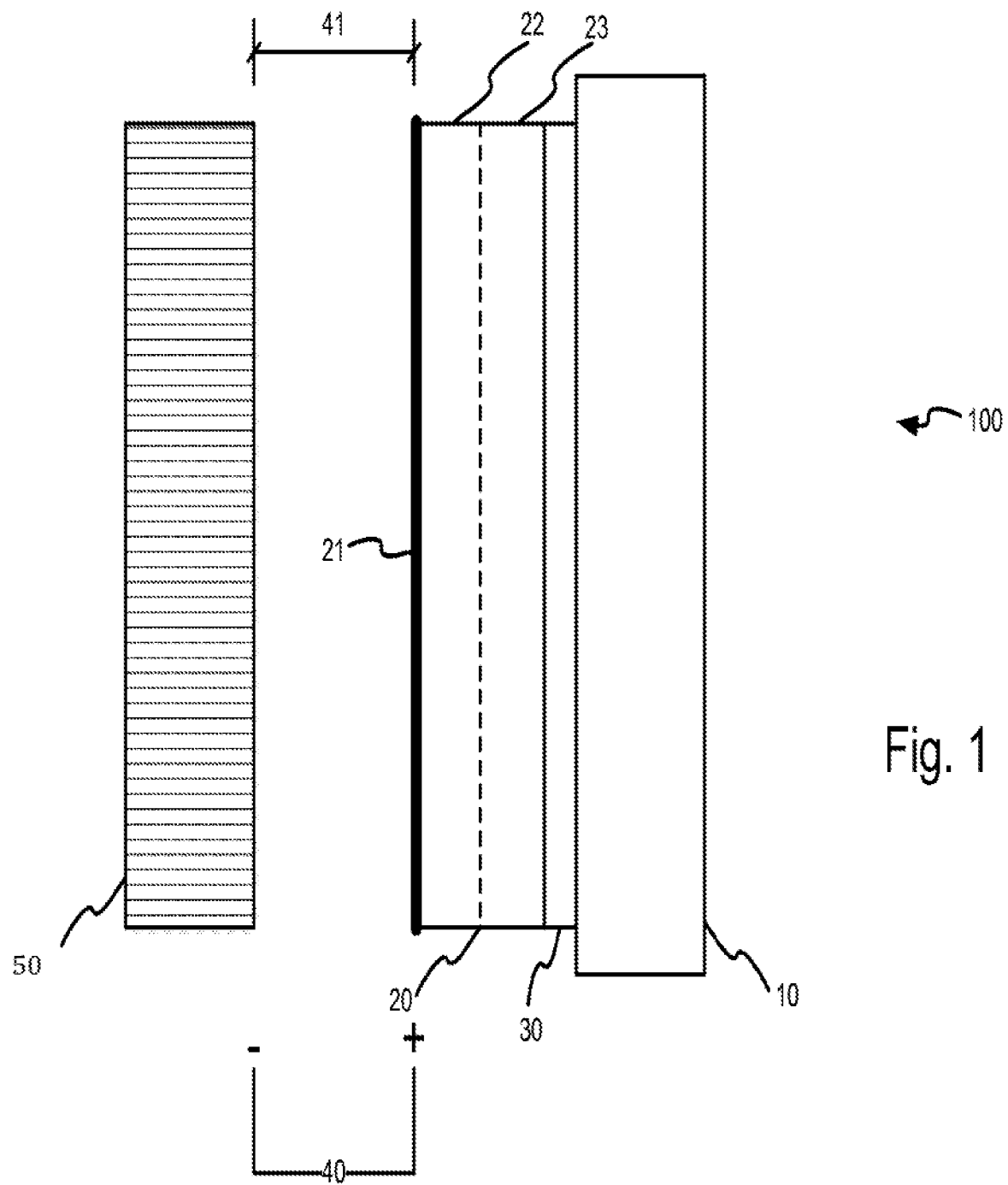
FIG. 1 illustrates a monocrystalline scintillator, in accordance with an embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used, Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

According to the embodiments disclosed herein an image intensifier generally includes a photocathode used to convert light to electrons, a microchannel plate (MCP) to amplify the number of electrons in each channel, and a scintillator (or phosphor) which converts the electrons back to photons. The image intensifier can also include an output window, which can be embodied as a fiber optic plate. The amplified image of the scene created by this arrangement can be detected by a camera or the human eye. Lenses can be used in some embodiments, in addition to fiber optic coupling, or a combination thereof.

The embodiments disclosed herein employ a monocrystal or single crystal. The monocrystal can be bonded to an optical plate. The bonded monocrystal disclosed herein can be subject to ultrasonic cleaning and bake out at temperatures ranging from 80-110 degrees Celsius.

According to one embodiment, a monocrystalline scintillator can comprise a monocrystal having a surface flatness of lambda/2 or better. An optical plate is adhered to the Monocrystal and the other side of the monocrystal is coated with a reflective coating. The optical plate can be a fiber optic plate. The coating may comprise any reflective material such as, for example, aluminum. The aluminum coating is preferably approximately 50-300 nm thick, but other thicknesses are also possible.

The monocrystal can be any number of options such as rare earth garnets, perovskites, rare earth silicates, or oxysulphides. A dopant such as a Ce dopant may be provided. It should be appreciated that other dopants may also be used.

The adhesive used to connect the monocrystal and optical plate can comprise an ultra-high vacuum (UHV) compatible adhesive such as EPO-TEK 301-2 or other such adhesive. The adhesive can be substantially transparent and preferably has a refractive index matching that of the optical plate.

The monocrystal itself can have a diameter of the 18 mm to approximately 100 mm, depending on the microchannel plate image intensifier application. In some embodiments, the optical plate can be a microchannel plate image intensifier output window incorporated within the microchannel plate image intensifier tube. In such cases, the monocrystal can have a diameter of approximately 1-2 mm less than a diameter of the MCP image intensifier tube output window. The monocrystalline scintillator can be approximately 5 μm to approximately 20 μm thick. When the monocrystalline scintillator is located within a microchannel plate image intensifier tube, the proximity focus and phosphor voltage (6-12 kV) can be optimized for a desired resolution and light gain.

In certain embodiments, the monocrystalline scintillator is located in a microchannel plate image intensifier configuration used in one of: an image intensified CCD, CID, or CMOS camera; an intensified optical microscope with enhanced spatial and time resolution; a fast framing camera device which can operate at >5 kHz; a streak tube device with enhanced spatial and temporal resolution; a night-vision device; or a surveillance camera device. In other embodiments, the monocrystalline scintillator is located within microchannel plate image intensifier tube of approximately 100 mm diameter (or other size depending on the application) and is used in one of: indirect x-ray imaging for (for example for crystalline diffraction studies); and indirect x-ray imaging for large diameter wafer topology. The monocrystalline phosphor can be bonded to an approximately 102 mm diameter fiber optic plate (or other sized fiber optic plate) used in indirect x-ray imaging for other large scene applications.

In certain embodiments, an imaging device including a monocrystalline scintillator can further comprise a lens or fiber optic coupling to a large diameter microchannel plate image intensifier which is fiber optically coupled to a large format CCD or CMOS camera used in an indirect x-ray imaging system for x-ray phase contrast imaging studies, indirect x-ray imaging for crystal diffraction studies, and indirect x-ray imaging for large wafer topology studies.

FIG. 1 illustrates an exemplary embodiment of a monocrystalline scintillator (or phosphor) 100. Monocrystalline scintillator 100 includes optical plate 10, monocrystal 20, adhesive 30, and optional gap voltage 40. A microchannel plate 50 is also shown.

In the exemplary embodiment, optical plate 10 can be a microchannel plate image intensifier (MCP II) output window. In other embodiments, optical plate 10 is an MCP II input window, an input fiber optic plate (FOP), or an output FOP. In certain embodiments, optical plate 10 has a 60/40 Scratch/Dig (S/D) finish and lambda/2 flatness at 550 nm. Optical plate 10 bonds to a first side of monocrystal 20 with adhesive 30.

Monocrystal 20 can be a single crystal approximately 5 um to approximately 20 um thick with lambda/2 flatness. Monocrystal 20 has a reflective coating 21 approximately 300 nm thick on a second, unbonded side. The reflective material may be aluminum or other such reflective material.

In an embodiment when optical plate 10 is an MCP II window, monocrystal 20 has a diameter of approximately 1-2 mm less than a diameter of optical plate 10. In other embodiments, monocrystal 20 has a diameter of approximately 100 mm. Other diameters are possible for monocrystal 20, depending on application.

In certain embodiments, monocrystal 20 has a cerium doped layer 22 and can have a non-doped layer 23. In the exemplary embodiment, cerium doped layer 22 has a thickness of approximately 5 um. In the exemplary embodiment, monocrystal 20 has an overall thickness of approximately twice that of cerium doped layer 22.

Monocrystal 20 can have a spectral output at 535 to 550 nm and a decay time of approximately 40-80 ns. Because of this short decay time, autogating features may be more effective. This short decay time may also support fast framing cameras with low residual light to a rate of up to 10 MHz for use in applications such as biomedical imaging.

Adhesive 30 bonds a first side of monocrystal 20 to optical plate 10. In the exemplary embodiment, adhesive 30 is a substantially transparent ultra-high vacuum compatible (UHV) adhesive with a refractive index matching that of optic plate 10.

In an embodiment, monocrystalline scintillator 100 includes gap voltage 40 and gap length 41. Gap voltage 40 is the voltage difference between monocrystal 20 and the side of a microchannel plate (MCP) facing monocrystal 20. Gap voltage 40 may range from approximately 6 kV to approximately 10 kV. When incorporating monocrystalline scintillator 100 into an existing system, gap voltage 40 may need to be raised in order to boost efficiency and to improve gain and resolution. Gap length 41 is the distance between monocrystal 20 and the side of a microchannel plate (MCP) facing monocrystal 20. When incorporating monocrystalline scintillator 100 into an existing system, gap length 41 may need to be altered in order to boost efficiency and to improve gain and resolution.

Figure 2:
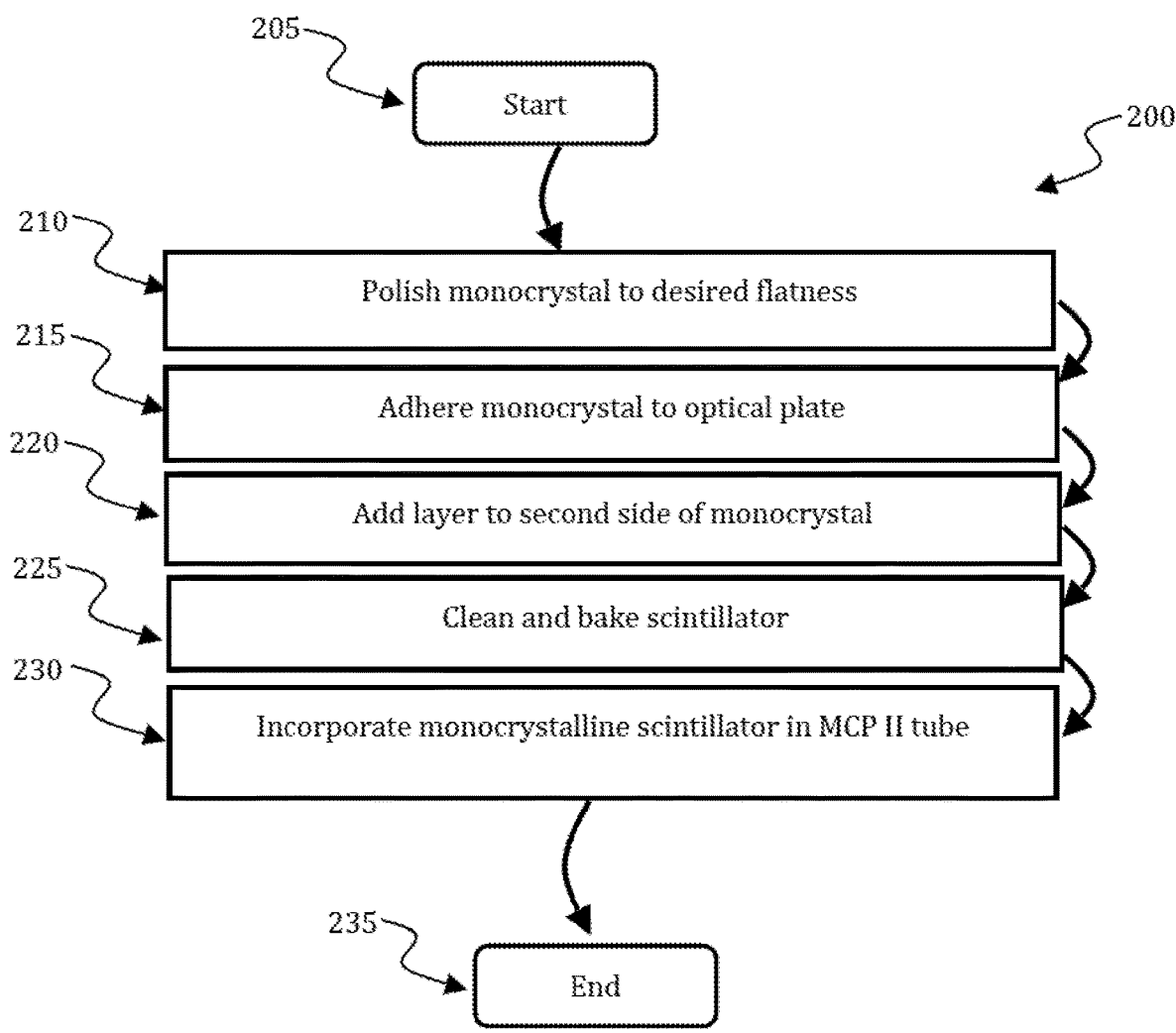
FIG. 2 illustrates a high level flow chart of method steps fabricating a monocrystalline scintillator, in accordance with another embodiment.

Method 200, shown in FIG. 2, is an exemplary embodiment for making a monocrystalline scintillator 100. The method 200 begins at step 205. In step 210, method 200 includes polishing a monocrystal 20 to a desired flatness. In an exemplary embodiment, lambda/2 flatness is preferable, but other flatness may also be desired.

In step 215, a first side of monocrystal 20 is adhered to an optical plate 10 by means of an adhesive 30. In step 220, a layer is added to the second side of monocrystal 20. In some embodiments, this layer comprises a reflective coating, often an aluminum coating 30, although other reflective coating materials may alternatively be used.

In optional step 225, monocrystalline scintillator 100 can be ultrasonically cleaned and baked. It should be understood that this step may occur at any point during the manufacturing method 200 illustrated in FIG. 2.

In an additional optional step, the monocrystalline scintillator 100 can be configured within an multi-channel plate image intensifier tube as illustrated at step 230. The method ends at step 235.

Figure 3:
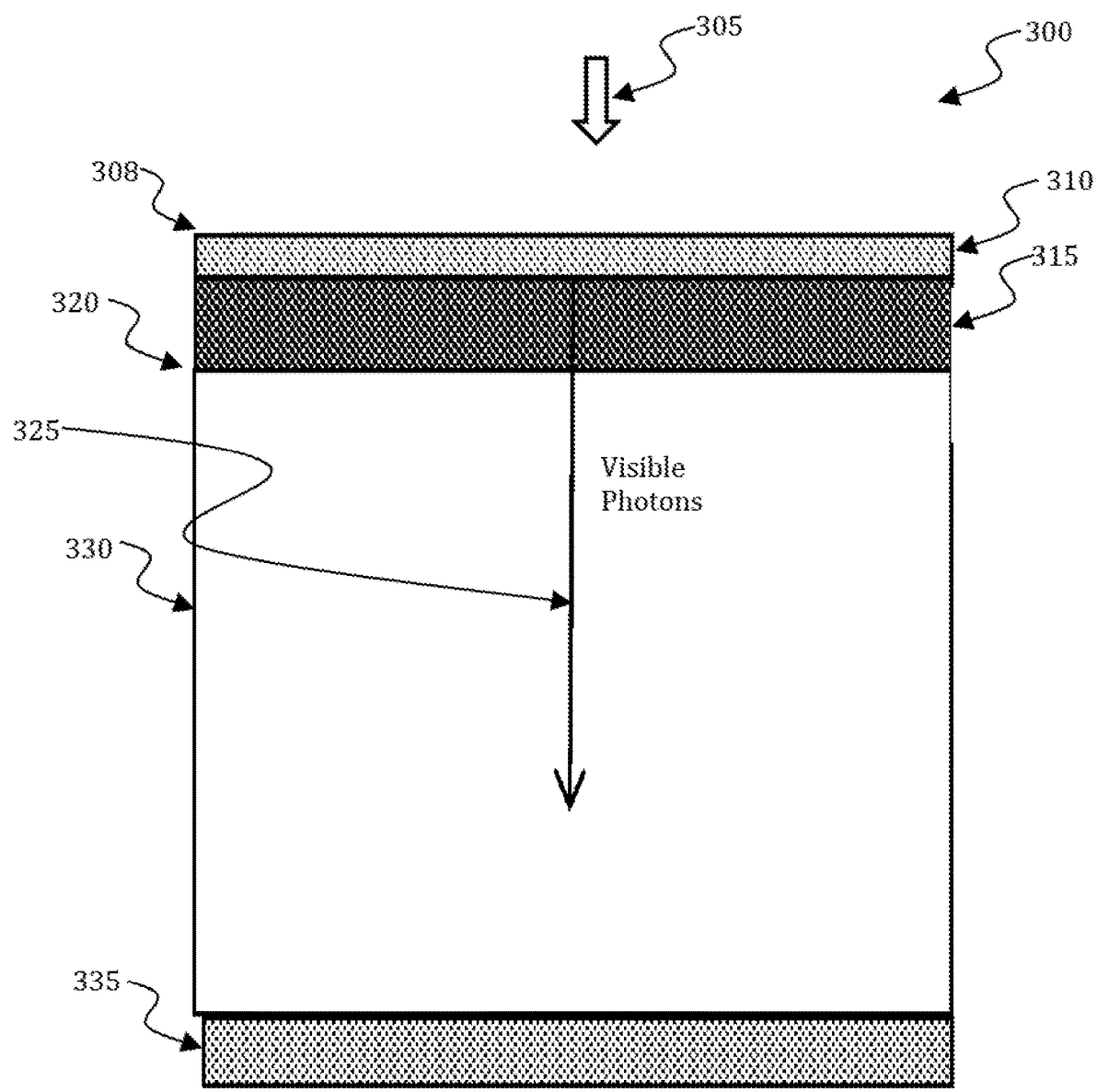
FIG. 3 illustrates a monocrystalline scintillator, in accordance with the disclosed embodiments.

FIG. 3 illustrates an embodiment of a monocrystalline scintillator 300. In the embodiment illustrated in FIG. 3, X-rays illustrated as arrow 305 are incident on a monocrystal 310 which may have an optional layer 308 embodied as a reflective coating. The monocrystal 310 generates photons 325. The monocrystal can comprise a Yttrium aluminum garnet activated by cerium. The monocrystal may alternatively be other similar materials provided the material provides a monocrystal. The dimensions of the monocrystal will vary, but may be 90 mm in diameter and have a thickness of 50-100 μm depending on the application.

A flat or substantially flat optical plate 315 is bound to the monocrystal 310. The optical plate 315 can be a fiber optic plate. The optical plate 315 can be operably connected to a fiber optic bundle 330, through which visible photons 325 generated from monocrystal 310 travel. The interface of the optical plate 315 and fiber optic bundle 330 is important. The fiber optic plate 315 can be polished to a desired flatness in order to provide a proper interface 320 with the fiber optic bundle 330.

The fiber optic bundle 330 can be connected to a CCD chip 335 or other such image sensor. The monocrystalline scintillator accordingly provides an X-ray imaging device. In particular, the monocrystalline scintillator can provide indirect x-ray imaging. This process involves the conversion of x-rays to visible light with enhanced spatial resolution and temporal resolution.

The large diameter (90-100 mm) monocrystal 310 is bonded to the fiber optic plate 315 in order to provide improved spatial resolution. The monocrystal 310 can be a rare earth monocrystal which has superior spatial resolution to prior art systems. Indeed, the embodiment can provide a factor of 8 improvement in the point spread function (PSF) for x-rays from a 25 keV tube voltage.

Additionally, by altering the numerical aperture of the fiber optic plate 315 bonded to the monocrystal 310 to 0.4 or less, the fundamental limitation of the fiber optic depth of focus of 6-8 microns for a numerical aperture (NA)=1 with 6 micron diameter fibers of typical bundles can be mitigated. This enables the imaging in a thicker monocrystal for more x-ray efficiency while allowing fiber optic coupling to the existing bundle faceplate. This preserves scintillator exchangeability when present in fiber optically coupled systems. The fiber optic plate 315 also provides mechanical strength for the large surface to thickness ratio of the high-resolution thin monocrystal. The monocrystal 310 also provides a locally uniform emission and the flatness (lambda/2 polishing) of the monocrystal 310 couples uniformly to the fiber optic plate 315.

The preferable fiber optic plate 315 thickness of 4 mm or greater (with prescribed optical flatness) provides significant x-ray attenuation for 17 keV x-rays in an inline detector arrangement. This is particularly relevant in an inline imaging configuration with a microchannel plate image intensifier (MCP II) where one wants to limit x-rays reaching the phosphor of the MCP II as a potential background source. The configuration is illustrated in FIG. 4.

Figure 4:
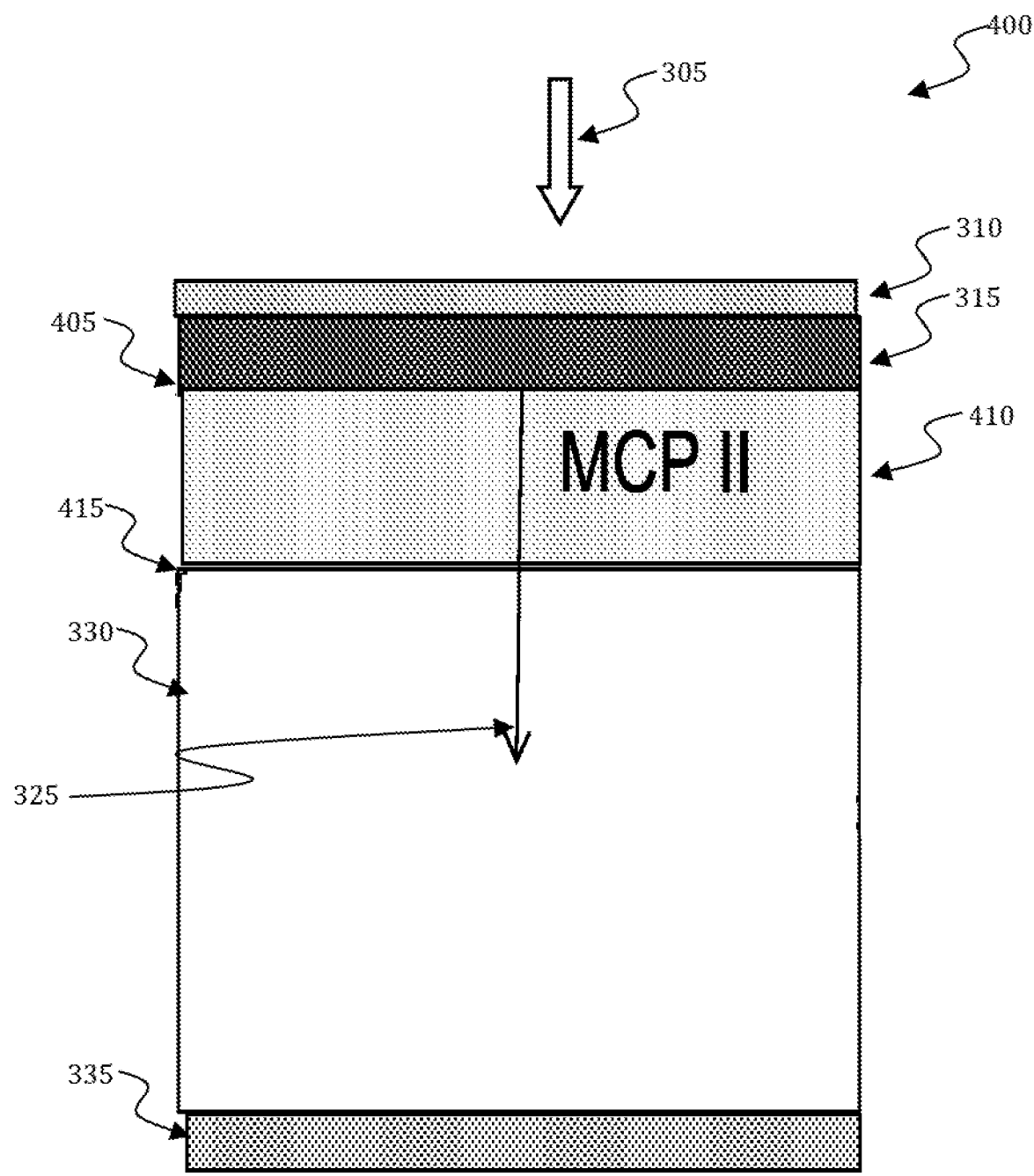
FIG. 4 illustrates an alternative monocrystalline scintillator, in accordance with the disclosed embodiments.

FIG. 4 illustrates another embodiment of a monocrystal scintillator. In this embodiment, a microchannel plate image intensifier 410 is introduced between the optical plate 315 and fiber optic bundle 330. Interface 405 is formed between the microchannel plate image intensifier 410 and the optical plate 315, and interface 415 is formed between microchannel plate image intensifier 410 and the fiber optic bundle 330. This configuration yields significant gain and reduced exposure time when necessary.

The embodiments can provide enhancement of multichannel plate image intensifier's spatial resolution and temporal resolution inside multichannel plate image intensifier tubes. In particular the embodiments provide resolution improvements of 2-4 in the multichannel plate image intensifier with a thin monocrystal scintillator 310 of 5-20 um thickness bonded to the output window or fiber optic plate. This involves converting 6-8 keV electron beam energy from the multichannel plate 410 output to visible light efficiently. An Al coat on the side towards the multichannel plate is used to block light from upstream and reflect scintillator light back out to the output window of the fiber optic plate.

This configuration directly impacts the obtainable spatial resolution in scientific applications for multichannel plate image intensifier in indirect x-ray imaging, indirect particle beam imaging, and direct photon imaging as well as security-related applications such as night vision goggles (NVG) and surveillance applications of all kinds.

In other embodiments, inline or off-axis indirect X-ray imaging systems can provide enhanced spatial resolution and significantly reduced exposure time. In this embodiment, a fully fiber optically coupled system is used with the monocrystal scintillator (e.g., x-ray converter screen) bonded to the fiber optic plate coupled to the input fiber optic plate at the photocathode of a large diameter multichannel plate image intensifier. The multichannel plate image intensifier can have the enhanced spatial resolution using a monocrystal scintillator with an output fiber optic plate. This is coupled to the faceplate of the fiber optic bundle already bonded to a large area CCD sensor. With a fiber optic bundle offset option, this can also be used in an off-axis mode for the multichannel plate image intensifier. Lens coupling can also be used with the fiber optic plate installed.

Autogating is a feature in low-light amplification devices that turns off voltage to a photocathode to prevent the field of view from becoming too bright or washed out due to a sudden increase in ambient light (in particular in night vision devices). Because current phosphors have a decay time of approximately 1.5 ms, autogating features in existing night-vision and other low-light amplification devices may need to be optimized to match the decay time of monocrystalline scintillator 100. In the embodiments disclosed herein method steps may be taken to optimizes gap voltage 40 by increasing gap voltage 40. Raising gap voltage 40 may improve gain and resolution of a device to allow a visual acuity increase from 20/36 to near 20/20 for night-vision devices. Improved gain and resolution may also provide increased utility for biomedical imaging applications. The monocrystalline scintillator can be used in night-vision devices and surveillance cameras used with CCD or fast framing cameras, as well as in streak tubes. Monocrystalline scintillators can also be used in x-ray detectors, for low light level scientific applications, and in processes with temporal dynamics.

The embodiments disclosed above provide two to four times better spatial resolution than prior art approaches, up to 10,000 times faster response time, and up to 3000 times more signal in the period immediately following (approximately 150 ns) a pulse of radiation or electrons. A major advantage of the monocrystalline scintillator disclosed herein is that a monocrystal has more uniform light emission across its surface than a polycrystal phosphor. The embodiments disclosed herein also provide 8-10 times better spatial resolution than a polycrystal phosphor of the same thickness; the latter inherently suffers from light scattering off multiple boundaries. Lower bake out temperatures are advantageous because the mechanical stresses which result from differing coefficients of expansion in the system are minimized. The embodiments disclosed herein further provide a tuned proximity focus and a higher MCP-phosphor potential difference for more gain.

Based on the foregoing, it can be appreciated that a number of embodiments are disclosed herein, preferred and alternative. For example, in one embodiment, a monocrystalline scintillator comprises: a monocrystal and an optical plate wherein a first side of the monocrystal is adhered to the optical plate.

In an embodiment, the monocrystal comprises at least one of a rare earth garnet, a perovskite crystal, a rare-earth silicate, and a monocrystal oxysulphide. In an embodiment, monocrystal comprises a doped volume.

In another embodiment, the monocrystalline scintillator comprises an adhesive adhering the optical plate to the first side of the monocrystal. The adhesive can comprise an ultra-high vacuum compatible adhesive. In an embodiment, the adhesive is substantially transparent and has a refractive index matching the optical plate. In an embodiment, the optical plate is a fiber optic plate.

In another embodiment, the monocrystalline scintillator further comprises a layer on a second side of the monocrystal. The layer on the second side of the monocrystal can comprise a reflective coating.

In another embodiment, the optical plate comprises an output window in a microchannel plate image intensifier tube. In an embodiment, the monocrystal has a surface flatness sufficient for bonding to the optical plate. In an embodiment, the monocrystal has a uniform emission.

In another embodiment, the monocrystalline scintillator is located within one of an image intensified camera, a fast framing camera device, a streak tube device, an indirect x-ray imaging device, an indirect particle beam device, a direct photon image device, a night-vision device, and a surveillance device.

In yet another embodiment, an imaging device comprises a monocrystal, an optical plate comprising a fiber optic plate wherein a first side of the monocrystal is adhered to the fiber optic plate, and a layer on a second side of the monocrystal. The fiber optic plate further comprises an output window in a microchannel plate image intensifier tube. The layer on the second side of the monocrystal comprises a reflective coating.

In another embodiment, a method comprises affixing a first side of a monocrystal to an optical plate, and configuring a layer on a second side of the monocrystal thereby resulting in a monocrystalline scintillator. In an embodiment, configuring a layer on a second side of the monocrystal further comprises coating a reflective coating on the second side of the monocrystal.

In another embodiment, the method comprises adhering the optical plate to the first side of the monocrystal with an ultra-high vacuum compatible adhesive wherein the ultra-high vacuum compatible adhesive is substantially transparent and has a refractive index matching the optical plate.

In another embodiment, the method further comprises ultrasonically cleaning the monocrystalline scintillator and baking the monocrystalline scintillator.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system, comprising:
   a monocrystal with a thickness between 5 microns and 20 microns, and with a decay time between 40 ns and 80 ns, said monocrystal comprising a single monocrystal with a doped volume and an undoped volume, with a total thickness that is twice that of a thickness of the doped volume;
   an adhesive; and
   an optical plate comprising a fiber optic plate wherein a first side of said monocrystal is physically adhered to said optical plate with said adhesive.

2. The system of claim 1, wherein said monocrystal comprises at least one of:
   a doped rare earth garnet;
   a perovskite crystal;
   a rare-earth silicate; and
   a monocrystal oxysulphide.

3. The system of claim 2 wherein said monocrystal has a diameter between 18 mm and 100 mm.

4. The system of claim 3, wherein said fiber optic plate is operably connected to a fiber optic bundle.

5. The system of claim 4 further comprising:
a first interface operably connecting said fiber optic bundle and said fiber optic plate;
an image sensor; and
a second interface operably connecting said fiber optic bundle and said image sensor.

6. The system of claim 5 further comprising:
a layer on a second side of said monocrystal, wherein said layer on said second side of said monocrystal comprises a reflective coating said reflective coating being 50 nm-300 nm thick.

7. The system of claim 6, further comprising:
a microchannel plate image intensifier tube configured for imaging, comprising:
a photocathode; and
a microchannel plate;
wherein said optical plate comprises an output window in said microchannel plate image intensifier tube.

8. The system of claim 6, wherein said monocrystal has a uniform emission.

9. The system of claim 1, wherein said monocrystal has a surface flatness of at least lambda/2 at 550 nm.

10. The system of claim 1, wherein said monocrystal has a diameter between 1 mm and 2 mm less than a diameter of said optical plate.

11. An imaging device comprising:
a monocrystal with a thickness between 50 microns and 100 microns said monocrystal further comprising a single monocrystal with a doped volume and an undoped volume and a total thickness that is twice that of a thickness of said doped volume;
an adhesive;
an optical plate comprising a fiber optic plate wherein a first side of said monocrystal is physically adhered to said fiber optic plate with said adhesive;
a layer on a second side of said monocrystal; and
a microchannel plate image intensifier tube configured for imaging, comprising:
a photocathode; and
a microchannel plate;
wherein said optical plate comprises an output window in said microchannel plate image intensifier tube, wherein said imaging device is configured for indirect X-ray imaging.

12. The imaging device of claim 11 wherein said fiber optic plate has a thickness of at least 4 mm, said fiber optic plate thereby providing X-ray attenuation.

13. The imaging device of claim 12 wherein said fiber optic plate has a numerical aperture of 0.4 or less, and said layer on said second side of said monocrystal comprises a reflective coating said reflective coating having a thickness of 50 nm-300 nm.

14. A method comprising:
physically affixing a first side of a monocrystal with a thickness between 5 microns and 20 microns, a decay time between 40 ns and 80 ns, wherein the monocrystal comprises a single monocrystal with a doped volume and an undoped volume, with a total thickness that is twice that of a thickness of said doped volume, to an optical plate with an adhesive;
configuring a layer on a second side of said monocrystal thereby forming a monocrystalline scintillator; and
configuring the optical plate as an output window in a microchannel plate image intensifier tube, the microchannel plate image intensifier tube, comprising:
a photocathode; and
a microchannel plate.

15. The method of claim 14 wherein configuring a layer on a second side of said monocrystal further comprises:
coating a reflective coating on said second side of said monocrystal said reflective coating having a thickness of 50 nm-300 nm.

16. The method of claim 14 wherein said monocrystal has a diameter between 18 mm and 100 mm.

17. The method of claim 14 further comprising:
ultrasonically cleaning said monocrystalline scintillator; and
baking said monocrystalline scintillator.

18. The method of claim 14 wherein said monocrystal comprises a single monocrystal.

* * * * *